United States Patent [19]

Monka

[11] Patent Number: 4,639,241
[45] Date of Patent: Jan. 27, 1987

[54] FREEWHEEL FOR A CYCLE OR THE LIKE
[75] Inventor: Edouard Monka, Incheville, France
[73] Assignee: Etablissements Maurice Maillard, Incheville, France
[21] Appl. No.: 792,307
[22] Filed: Oct. 28, 1985
[30] Foreign Application Priority Data Nov. 29, 1984 [FR] France ................ 84 18219

[51] Int. Cl.[4] ............................. F16H 55/12
[52] U.S. Cl. ................... 474/902; 403/261; 403/359
[58] Field of Search ........... 474/160, 902, 199; 29/229, 453, 517, 520; 403/326, 261, 359

[56] References Cited
U.S. PATENT DOCUMENTS 4,102,215 7/1978 Nagano et al. ............ 474/160
4,311,473 1/1982 Sugimoto ................. 474/160
4,565,392 1/1986 Vyse ................... 403/326 X

FOREIGN PATENT DOCUMENTS 147434 11/1980 Japan ..................... 29/520

Primary Examiner—James A. Leppink
Assistant Examiner—William P. Neuder
Attorney, Agent, or Firm—Wolf, Greenfield & Sacks

[57] ABSTRACT

A freewheel for a cycle or the like, comprising a hollow body of generally circular shape which receives on its periphery at least one gearwheel retained laterally between two flanges, means also being provided for securing the gearwheel to the body in a manner precluding relative rotation.

At least one of the flanges comprises a metal part which is accommodated, by permanent deformation, in a groove on the periphery of the body.

3 Claims, 10 Drawing Figures

PRIOR ART FIG.1
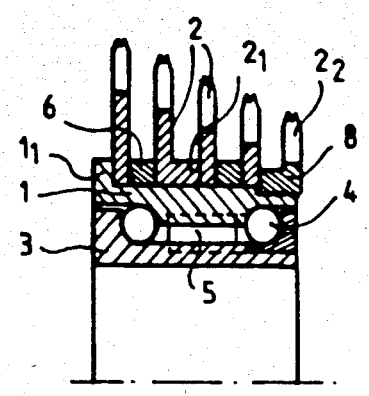
PRIOR ART FIG.2
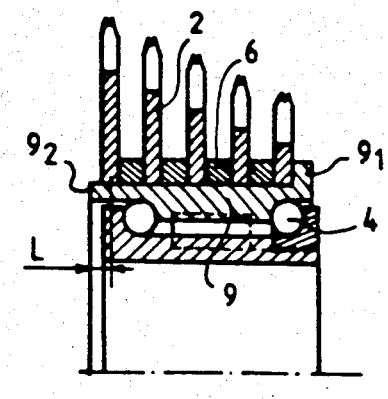
FIG.3
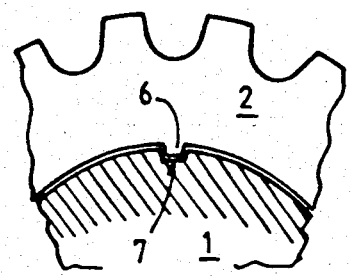
FIG.4
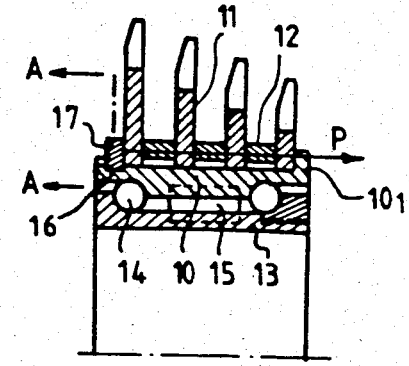
FIG.5
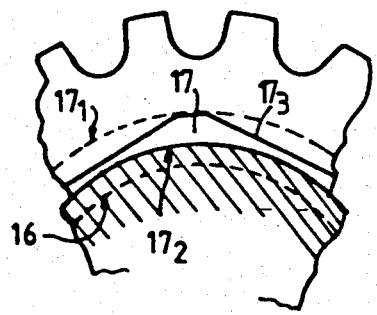
FIG.6   FIG.7
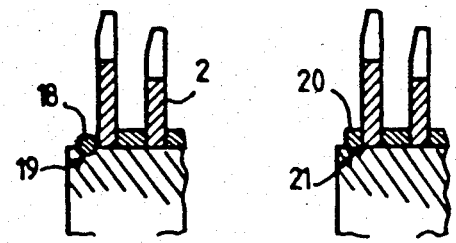

4,639,241

FREEWHEEL FOR A CYCLE OR THE LIKE

BACKGROUND OF THE INVENTION

1. FIELD OF THE INVENTION

The invention relates to a freewheel for a cycle or the like.

2. DESCRIPTION OF THE PRIOR ART

Freewheels for cycles comprise a hollow body 1 (see FIG. 1) of generally circular shape which receives on its periphery the gearwheel or gearwheels 2 of the freewheel and which is mounted to rotate on a hub 3 by means of ball bearings 4 and an assembly of detents and pawls 5.

The gearwheels 2 are maintained uniformly spaced apart and parallel to the periphery of the body 1 either by means of independent spacers 6 or by means of flanges $2_1$ formed laterally on the inner periphery of the gear wheels 2.

These gearwheels 2 are locked for rotation with the body 1, for example (see FIG. 3) by one or more detents 6 provided on the inner periphery of the gearwheels 2, said detents engaging in corresponding grooves 7 formed on the periphery of the body 1.

Lateral support for the gearwheels 2, suitably spaced apart, is afforded in various ways. In the example in FIG. 1, the body 1 comprises at one of its ends an outer flange $1_1$, the set of spaced gearwheels 2 being mounted to abut against this outer flange $1_1$. The lateral location of these gearwheels against the flange $1_1$ is effected by a member 8 secured by being screwed on to the body 1 and, if desired, this member can itself comprises a gearwheel $2_2$.

However, an installation of this type entails special machine finishing which increases the cost of the freewheel.

In the example in FIG. 2, the body 9 of the freewheel carries at one of its ends an outer flange $9_1$ against which abuts the set of gearwheels 2 suitable spaced apart by spacers 6.

In this case, the lateral location of the gearwheels 2 is effected by riveting the opposite end $9_2$ of the body. However, this operation is both difficult to perform and costly. In fact, the body of the freewheel is subjected to thermal treatment so as to provide the desired quality of bearing by means of balls 4, with the result that for this riveting operation of the end $9_2$ it is necessary to carry out partial tempering of this end. However, this tempering has to be limited to the length L without reaching the hardened track of the body.

SUMMARY OF THE INVENTION

Therefore, the present invention has the object of eliminating these disadvantages and of devising a novel means ensuring rapid, robust and inexpensive mounting of the gearwheel or gearwheels of a freewheel on its body.

To this end, the invention provides a freewheel for a cycle or the like, comprising a hollow body of generally circular shape which receives on its periphery at least one gearwheel retained laterally between two flanges, means also being provided for securing the gearwheel to the body in a manner precluding relative rotation, wherein at least one of the flanges comprises a metal part which is accommodated, by permanent deformation, in a groove on the periphery of the body.

Preferably the deformable metal part is an annular part of which the original internal diameter, prior to deformation, is at least equal to the diameter of the periphery of the body; the groove is annular; and the permanent deformation to which the part is subjected provides flats on the periphery of the part.

BRIEF DESCRIPTION OF THE DRAWINGS

FIG. 1 is schematic axial section through a known mode of embodiment of a freewheel;

FIG. 2 is a sectional view of another known mode of embodiment;

FIG. 3 illustrates known means for ensuring that gearwheels are locked for rotation on the body of the freewheel;

FIG. 4 is a view in axial section of a mode of embodiment of a freewheel according to the invention;

FIG. 5 is a schematic part sectional view along the line A—A in FIG. 4;

FIG. 6 and 7 illustrate schematically two forms of embodiment of deformable parts and their groove;

DETAILED DESCRIPTION OF THE PREFERRED EMBODIMENTS

Figure 8:
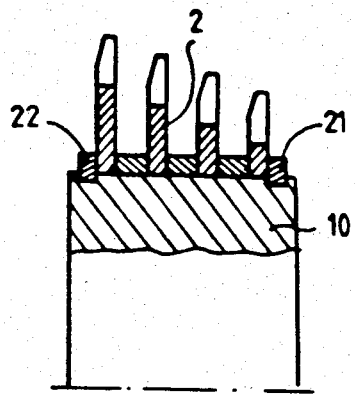
FIGS. 8, 9, 10 and 11 illustrate in schematic axial section four modes of embodiment of the freewheel according to the invention.

The freewheel illustrated in FIG. 4 comprises a hollow body 10 of circular shape provided at one of its ends with a machined flange $10_1$ against which abuts the set of gearwheels 11 suitably maintained spaced apart by independent spacers 12.

In known manner, this body 10 is also mounted to rotate on a hub 13 by means of a ball bearing 14 and an assembly of pawls and ratchets 15.

The end of the body 10 opposite to that of the flange $10_1$ comprises a circular groove 16 which accommodates partially, by permanent deformation, a part 17 which is also annular.

The internal diameter of this part 17 is initially, i.e. prior to deformation, of a diameter which is at lest equal to the diameter of the body 10 of the freewheel so that that said part can be positioned on the freewheel level with the groove 16. Subsequently, this part 17 is subjected to permanent deformation by pressing so as, on the one hand, to cause it to penetrate into the interior of the groove 16 and, on the other hand, to create a stress P in axial direction, which has the purpose of powerfully applying and clamping in a lateral direction the set of gearwheels 11 and spacers 12 against the flange $10_1$.

To carry out this operation, the part 17 is made of per se known steel, the characteristics of which are such that it can be deformed permanently taking into account the size of this part 17.

Preferably, this pressing operation ensuring the deformation of the washer 17 is carried out in such a way that flats are formed uniformly spaced apart on the periphery of this part 17, thereby giving it a generally polygonal shape (see FIG. 5). Therefore, this part 17 which, prior to deformation, has an outer diameter indicated at $17_1$ and an inner diameter indicated at $17_2$ becomes, after deformation, a part whose periphery $17_3$ is polygonal, whereas its inner edge is accommodated and secured inside the groove 16.

In the embodiment of FIGS. 4 and 5, the deformable annular part 17 is of rectangular section, however, other modes of embodiment could be adopted.

Thus, according to FIG. 6, the deformable part 18 is given a toroidal shape and is accommodated in a groove 19 of corresponding section.

Similarly, in the embodiment of FIG. 7, the deformable annular part 20 is of rectangular section, whereas the groove 21 of the body 10 has, at its bottom, circular or helical grooves in the form of saw teeth, in which the material of the part 20 engages during its deformation.

In the example described above the internal diameter of the part 17 is at least equal to the diameter of the body which has to receive it, so that it can be positioned above the groove into which it is to be fitted by deformation.

However, insofar as it is desired to reduce the degree of the deformation to be carried out on the part 17, it is possible for this part 17 to take the form of a split ring which can itself undergo a certain degree of elastic deformation. In this case, the ring 17 is given a slightly smaller diameter than that of the periphery of the freewheel so that it is accommodated at least partly, by elastic deformation, inside the groove in which it is then deformed in a permanent fashion by pressing.

Also in the example of FIG. 4, the lateral location of the gearwheels 11 is carried out by a flange $10_1$ machined on the body 10 and by a flange formed by a deformable part 17.

However, as illustrated in FIG. 8, this lateral location of the gearwheels 2 could be effected by two end flanges, each formed by an annular part, split or unsplit, 21 and 22 accommodated in corresponding grooves of the body 10.

Figure 9:
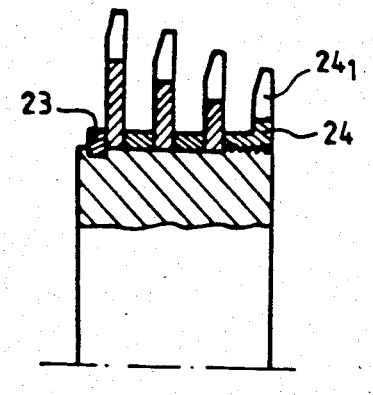

Similarly, if it is desirable for the gearwheels of this freewheel to be dismountable (see FIG. 9), the location of the gearwheels would be ensured by a deformable part 23 accommodated in its corresponding groove, whereas the other end would be retained, in known manner, by a screwed-on flange 24 optionally provided with a gearwheel $24_1$.

Figure 10:
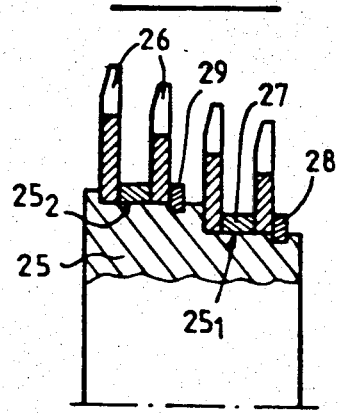

In the embodiment in FIG. 10, the body 25 of the freewheel comprises on its periphery two stepped cylindrical zones $25_1$ and $25_2$ on each of which are mounted two gearwheels 26 separated by a spacer 27, the location of these two gearwheels being ensured in each case by a deformable part 28 and 29.

This arrangement makes it possible to lower the cost of the freewheel by reducing the amount of material necessary to produce, on the one hand, the gearwheels 26 and, on the other hand, the freewheel body 25.

Figure 11:
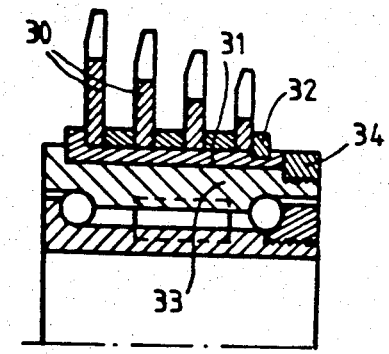

Insofar as it is desirable for the gearwheels of the freewheel to be completely interchangeable, it would also be possible (see FIG. 11) to secure the set of suitable spaced gearwheels 30 on an independent part 31, of which at least one end comprises a deformable part 32 which ensures location. This part 31 is then mounted in detachable manner on a freewheel body 33, where it is held in place by a nut-like part 34.

What is claimed is:

1. A freewheel for a cycle, comprising a hollow body of generally circular shape which receives on its periphery a plurality of regularly spaced gearwheels retained laterally between two flanges, means also being provided for securing the gearwheels to the body in a manner precluding relative rotation, wherein at least one of the flanges comprises an annular part of which the original internal diameter is at least equal to the diameter of the periphery of the body which is accommodated, by permanent deformation, in an annular groove on the periphery of the body.

2. A freewheel according to claim 1, wherein the deformable part is a split annular part.

3. A freewheel according to claim 1, wherein the deformable part is toroidal and the groove in the body in which it is accommodated is correspondingly shaped.

* * * * *